United States Patent
Colin et al.

(10) Patent No.: US 11,148,204 B2
(45) Date of Patent: Oct. 19, 2021

(54) METHOD FOR THE ADDITIVE MANUFACTURING OF A PART BY SELECTIVE MELTING OR SELECTIVE SINTERING OF OPTIMIZED-COMPACTNESS POWDER BEDS USING A HIGH ENERGY BEAM

(71) Applicants: SNECMA, Paris (FR); MBDA FRANCE, Le Plessis Robinson (FR)

(72) Inventors: Christophe Colin, Evry (FR); Jean-Baptiste Mottin, Poitiers (FR); Laëtitia Kirschner, Paris (FR); Gérard Saussereau, Le Mesnil Saint Denis (FR)

(73) Assignees: SAFRAN AIRCRAFT ENGINES, Paris (FR); MBDA FRANCE, Le Plessis-Robinson (FR)

( * ) Notice: Subject to any disclaimer, the term of this patent is extended or adjusted under 35 U.S.C. 154(b) by 465 days.

(21) Appl. No.: 14/647,519

(22) PCT Filed: Nov. 27, 2013

(86) PCT No.: PCT/FR2013/052867
§ 371 (c)(1),
(2) Date: May 27, 2015

(87) PCT Pub. No.: WO2014/083277
PCT Pub. Date: Jun. 5, 2014

(65) Prior Publication Data
US 2015/0321255 A1 Nov. 12, 2015

(30) Foreign Application Priority Data
Nov. 27, 2012 (FR) ...................................... 1203196

(51) Int. Cl.
*B22F 10/20* (2021.01)
*C04B 35/64* (2006.01)
(Continued)

(52) U.S. Cl.
CPC ............ *B22F 10/20* (2021.01); *B22F 1/0014* (2013.01); *B22F 3/105* (2013.01); *B28B 1/001* (2013.01);
(Continued)

(58) Field of Classification Search
CPC ........ B28B 1/001; B29C 64/153; B33Y 10/00
See application file for complete search history.

(56) References Cited

U.S. PATENT DOCUMENTS

| 5,038,014 A | 8/1991 | Pratt et al. |
| 5,155,324 A | 10/1992 | Deckhard et al. |

(Continued)

FOREIGN PATENT DOCUMENTS

| CN | 1476362 A | 2/2004 |
| JP | 2003-328014 A | 11/2003 |

(Continued)

OTHER PUBLICATIONS

"Polycarbonate." City Plastics. Dec. 19, 2013. p. 1-3 (Year: 2013).*
(Continued)

*Primary Examiner* — Nicholas A Wang
(74) *Attorney, Agent, or Firm* — Pillsbury Winthrop Shaw Pittman LLP (57) ABSTRACT

A method for fabricating a part by selective melting or sintering of powder beds by high energy beam, the method including a) providing a material in the form of powder particles; b) depositing a first powder layer on a support; c) scanning a region of the first layer with the beam to heat the powder locally to a temperature higher than the powder sintering temperature, such that the powder particles as (Continued)

melted or sintered form a first single-piece element; d) depositing a second powder layer on the first powder layer; e) scanning a region of the second layer with the beam to heat the powder to a temperature higher than the powder sintering temperature, so that the particles of powder as sintered or melted form a second single-piece element; and f) repeating d) and e) for each new powder layer laid over a preceding layer until the part is formed.

20 Claims, 5 Drawing Sheets (51) Int. Cl.
*B28B 1/00* (2006.01)
*C22C 19/05* (2006.01)
*B33Y 10/00* (2015.01)
*B22F 1/00* (2006.01)
*B29C 64/153* (2017.01)
*B22F 3/105* (2006.01)
*B29L 31/00* (2006.01)
*B33Y 70/00* (2020.01)
*B22F 10/30* (2021.01)

(52) U.S. Cl.
CPC ............ *B29C 64/153* (2017.08); *B33Y 10/00* (2014.12); *C04B 35/64* (2013.01); *C22C 19/055* (2013.01); *C22C 19/056* (2013.01); *B22F 10/30* (2021.01); *B29L 2031/772* (2013.01); *B33Y 70/00* (2014.12); *Y02P 10/25* (2015.11)

(56) References Cited

U.S. PATENT DOCUMENTS

| 5,837,960 | A * | 11/1998 | Lewis ............... | B23K 26/34 219/121.63 |
| 6,243,616 | B1 * | 6/2001 | Droscher ............ | B33Y 70/00 700/118 |
| 2002/0015654 | A1 * | 2/2002 | Das .................. | B22F 3/1055 419/8 |
| 2002/0090313 | A1 | 7/2002 | Wang et al. | |
| 2002/0158054 | A1 | 10/2002 | Manetsberger et al. | |
| 2002/0176793 | A1 * | 11/2002 | Moussa .............. | B22F 3/1283 419/8 |
| 2003/0175621 | A1 | 9/2003 | Hinczewski | |
| 2006/0083652 | A1 | 4/2006 | Liu et al. | |
| 2006/0108712 | A1 * | 5/2006 | Mattes .............. | B22F 3/004 264/308 |
| 2007/0298182 | A1 * | 12/2007 | Perret .............. | B22F 3/1055 427/427.3 |
| 2009/0068055 | A1 | 3/2009 | Sreedhara et al. | |
| 2009/0068376 | A1 | 3/2009 | Philippi et al. | |
| 2009/0206522 | A1 | 8/2009 | Hein et al. | |
| 2010/0291401 | A1 | 11/2010 | Medina et al. | |
| 2012/0018915 | A1 * | 1/2012 | Ookubo .............. | C08J 3/122 264/113 |
| 2012/0061065 | A1 * | 3/2012 | LaCombe ............. | F28D 20/02 165/185 |
| 2012/0237745 | A1 | 9/2012 | Dierkes et al. | |
| 2014/0010908 | A1 | 1/2014 | Matsumoto et al. | |

FOREIGN PATENT DOCUMENTS

| JP | 2004-504490 A | 2/2004 |
| JP | 2005-533177 A | 11/2005 |
| JP | 2008-540173 A | 11/2008 |
| RU | 2052773 C1 | 1/1996 |
| RU | 2011105661 A | 8/2012 |
| SU | 983407 A | 12/1982 |
| WO | WO 2004/007124 A1 | 1/2004 |
| WO | WO 2012/124828 A1 | 9/2012 |

OTHER PUBLICATIONS

Gibson, I. et al. "Additive Manufacturing Technologies." 2010. Springer. p. 116 (Year: 2010).*
Wonisch, A. et al. "effect of different particles size distributions on solid-state sintering: a microscopic simulation approach." 2009. Journal of American Ceramic Society. 92. p. 1428-1434. (Year: 2009).*
International Search Report as issued in International Patent Application No. PCT/FR2013/052867, dated Mar. 17, 2014.
First Office Action as issued in Chinese Patent Application No. 201380061843.6, dated Mar. 25, 2016.
Notice of Reasons for Rejection as issued in Japanese Patent Application No. 2015-544516, dated Dec. 19, 2017.
Office Action as issued in Russian Patent Application No. RU2015125546, dated Oct. 23, 2017.
Office Communication as issued in European Patent Application No. 13808115.3, dated Jul. 19, 2018.
Office Communication as issued in European Patent Application No. 13808115.3, dated Jan. 14, 2019.
Li, M., et al., "Comparison of Particle Size Distributions Measured Using Different Techniques," Particulate Science and Technology, vol. 23, No. 3, Feb. 2007, XP055269915, pp. 265-284.
Japanese Notice of Reasons for Rejection as issued in Japanese Patent Application No. 2018-216746, dated Sep. 3, 2019.
Office Action issued in Indian Patent Application No. 5039/DELNP/ 2015, dated Jan. 1, 2020.
Office Communication as issued in European Patent Application No. 13808115.3, dated Feb. 7, 2020.
Liu, B., et al., "Investigation the Effect of Particle Size Distribution on Processing Parameters Optimisation in Selective Laser Melting Process," Jan. 2011, XP055664077, Retrieved from the Internet: URL: <https://www.researchgate.net/profile/Christopher_Tuck/publication/268365007_Investigaztion_the_effect_of_particle_size_distribution_on_processing_parameters_optimisation_in_selective_laser_melting_process/links/54b8ee3d0cf269D9cbf722c9/Investigaztion-the-effect-ofparticle-size-distribution-on-proce>, [retrieved on Jan. 31, 2020], pp. 227-238.

* cited by examiner

METHOD FOR THE ADDITIVE MANUFACTURING OF A PART BY SELECTIVE MELTING OR SELECTIVE SINTERING OF OPTIMIZED-COMPACTNESS POWDER BEDS USING A HIGH ENERGY BEAM

CROSS REFERENCE TO RELATED APPLICATIONS

This application is the U.S. National Stage of PCT/FR2013/052867 filed Nov. 27, 2013, which in turn claims priority to French Application No. 1203196, filed Nov. 27, 2012. The contents of both applications are incorporated herein by reference in their entirety.

The present invention relates to the field of fabricating parts by using a high energy beam (laser beam, electron beam, . . . ) for selectively melting or selectively sintering beds of powder.

In particular, the present invention relates to fabricating metallic, intermetallic, ceramic, or polymeric parts.

More particularly, the invention relates to a fabrication method for fabricating a part by selective melting of powder beds by high energy beam, the method comprising the following steps:

a) providing a material in the form of powder particles;

b) depositing a first powder layer of said material on a build support (the support may be solid, a portion of another part, or a support grid used to facilitate building certain parts);

c) scanning at least one region of said first layer with the beam so as to heat the powder of this region locally to a temperature higher than the sintering temperature of the powder, such that the particles of said powder as sintered or melted in this way form at least a first single-piece element;

d) laying a second powder layer of said material on the first powder layer;

e) scanning at least one region of the second layer with the beam so as to heat the powder of this region to a temperature higher than the sintering temperature of the powder, so that the particles of powder as sintered or melted in this way form at least one second single-piece element (in general this region of the second layer is situated in part or completely over the region of the first layer that was scanned by the beam in step c), such that the powder particles melted or sintered in step c) and in step e) together form a single piece; nevertheless, in certain circumstances, in particular for fabricating portions of a part with undercut, the region of the second layer is not situated over the region of the first layer that was scanned by the beam in step c) and the powder particles melted or sintered in step c) and in step e) then do not form a single-piece unit; and f) repeating steps d) and e) for each new powder layer to be laid over a preceding layer, in which at least one region has already been melted or sintered, until the part has been completely formed.

The invention relates in particular to rapid fabrication of parts by selective melting of beds of powder by using a laser.

Selective laser melting (SLM) is a method having the main characteristics that are recalled below, with reference to FIG. 1.

A first layer 10 of powder of a material is deposited on a build support 80, e.g. by means of a roller 30 (or any other deposition means), the powder being taken from a feed bin 70 during a go movement of the roller 30, and then it is scraped, and possibly compacted a little, during one (or more) return movements of the roller 30. The powder is made up of particles 60. Excess powder is recovered in a recycling bin 40 situated adjacent to the build bin 85 in which the build support 80 moves vertically.

Then a region of this first layer 10 of powder is taken to a temperature higher than the melting temperature $T_F$ of the powder (liquidus temperature) by scanning with a laser beam 95.

The SLM method can use any high energy beam instead of the laser beam 95, providing the beam has sufficient energy to melt the particles of powder and a portion of the material on which the particles rest (also referred to as the dilute zone forming an integral portion of the liquid pool).

This laser scanning may be performed for example by a galvanometer head forming part of a control system 50. By way of example and in non-limiting manner, the control system may comprise at least one steerable mirror 55 on which the laser beam 95 is reflected prior to reaching a layer of powder having all points on its surface situated at the same height relative to the focusing lens contained in the focusing system 54, the angular position of the mirror being controlled by a galvanometer head so that the laser beam scans at least a region of the first layer of powder, and thus follows a pre-established profile of a part. For this purpose, the galvanometer head is controlled on the basis of information contained in a database of the computer tool used for computer assisted design and manufacturing of the part that is to be fabricated.

Thus, the powder particles 60 in this region of the first layer 10 are melted and form a first single-piece element 15 that is secured to the build support 80. At this stage, it is also possible to use the laser beam to scan a plurality of independent regions of the first layer so that after the material has melted and solidified a plurality of mutually disjoint first elements 15 are formed.

The support 80 is lowered through a height corresponding to the height already defined for the first layer (lying in the range 20 micrometers (μm) to 100 μm, and generally in the range 30 μm to 50 μm). The thickness of the layer of powder for melting or consolidating remains a value that may vary from one layer to another since it depends strongly on the porosity of the powder bed and on its planeness, whereas the preprogrammed movement of the support 80 is a value that does not vary, ignoring slack. It should be recalled that the thickness of the layer for melting or consolidating is often as much as 50% greater than the movement of the support 80, except for the first layer if the surface of the support 80 is accurately parallel to the axis of the roller 30.

Figure 1:
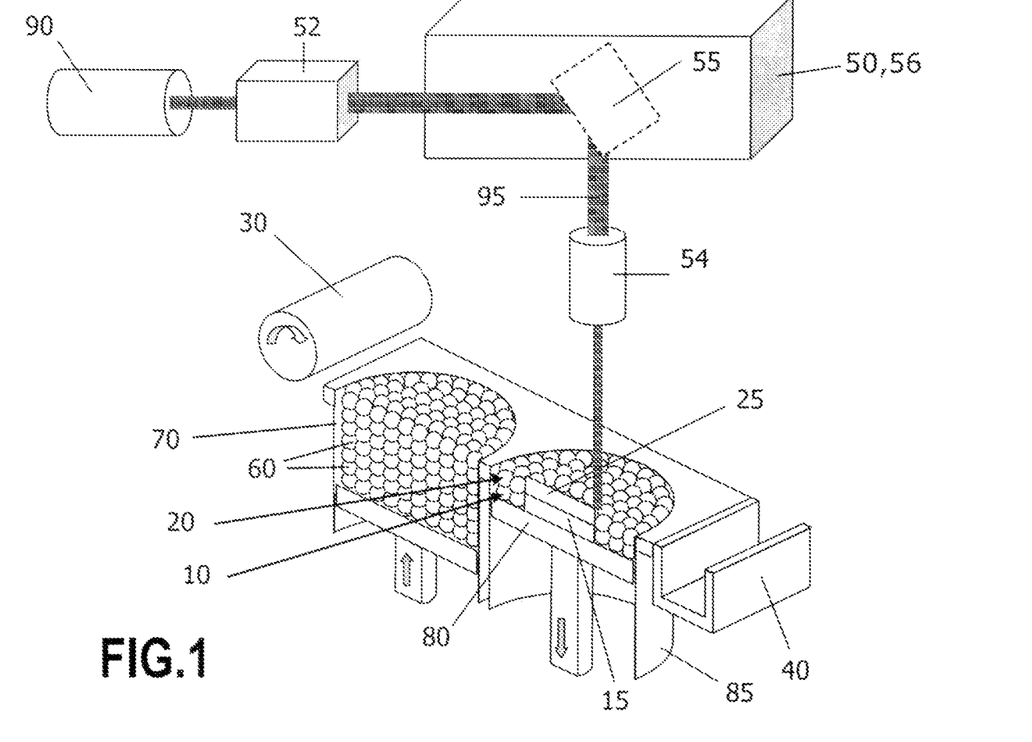
FIG. 1 is a diagram for explaining the prior art method and showing the device used.

Thereafter, a second powder layer 20 is deposited on the first layer 10 and on the first single-piece or consolidated element 15, and then a region of the second layer 20 is heated by being exposed to the laser beam 95, the heated region may be situated in full or in part over the first single-piece or consolidated element 15 as shown in FIG. 1, such that the particles of powder in this region of the second layer 20 melt together with at least a portion of the first element 15 so as to form a second single-piece or consolidated element 25, with these two elements 15 and 25 together forming a single-piece block in the example shown in FIG. 1. For this purpose, the second element 25 is advantageously already completely bonded as soon as a second element 25 becomes bonded to the first element 15.

It can be understood that depending on the profile of the part to be built, and in particular if there is an undercut surface, it can happen that the above-mentioned region of the first layer 10 does not lie, even in part, under the above-mentioned region of the second layer 20, such that under such circumstances the first consolidated element 15 and the second consolidated element 25 then do not form a single-piece block.

This process of building the part layer by layer is then continued by adding additional layers of powder to the assembly that has already been formed.

Scanning with the laser beam 95 makes it possible to build each layer while giving it a shape that matches the shape of the part to be made. The lower layers of the part cool more or less quickly as the upper layers of the part are being built.

The invention also relates to rapid fabrication of parts without melting, namely by selective sintering of powder beds by laser. Selective laser sintering (SLS) specifies a method that is similar to SLM, except that in SLS, the powder is raised to a temperature that is lower than the melting temperature $T_F$ of the powder (liquidus temperature), either to a temperature that is higher than the solidus temperature but less than the liquidus temperature with sintering taking place in the liquid phase, with the material melting in part (material in a pasty state with solid and liquid phases coexisting), or else this temperature is lower than the solidus temperature but higher than 0.5 $T_F$ and the sintering is solid phase sintering (all of the material is solid and the sintering takes place essentially by diffusion in the solid phase).

In order to reduce contamination of the part, e.g. contamination by dissolved oxygen, by oxide(s), or by some other pollutant while the part is being fabricated layer by layer as described above, this fabrication needs to be performed in an enclosure having controlled humidity and adapted to the process and the material involved, being filled with a gas that is inert (non-reactive) relative to the material in question, such as nitrogen ($N_2$), argon (Ar), or helium (He), optionally with a small amount of hydrogen ($H_2$) being added for its reducing power. A mixture of at least two of these gases may also be considered. In order to prevent contamination, in particular by oxygen from the surrounding medium, it is common practice to ensure that the enclosure is at a pressure higher than atmospheric.

Thus, in the present state of the art, selective melting or selective sintering by laser makes it possible, with good dimensional accuracy, to build parts having little pollution and of three-dimensional shape that can be complex, but of mechanical strength that is still not sufficient for certain applications and for which it is necessary to achieve better optimization of the method.

Selective melting or selective sintering by laser also preferably makes use of powders of spherical morphology that are clean (i.e. not contaminated by residual elements coming from preparation of the powder), very fine (the dimension of each particle lies in the range 1 μm to 100 μm and preferably in the range 1 μm to 50 μm or indeed in the range 1 μm to 20 μm), thereby making it possible to obtain an excellent surface state for the finished part.

Selective melting or selective sintering by laser also makes it possible to reduce fabrication times, costs, and fixed expenses, compared with a part that is made by molding, injection, forging, or machining from solid.

Parts made by selective melting or selective sintering by laser nevertheless present drawbacks.

The part still becomes contaminated with too much oxygen or any other pollutant, even when steps are taken to fill the fabrication enclosure (comprising the build bin 85, the feed bin 70, and the roller 30 or other deposition means) with a gas that is inert (non-reactive) for the material in question. It is difficult to extract all oxygen from the enclosure, and furthermore the gases used are never 100% pure. This contamination leads to the material constituting the part being embrittled and/or hardened and/or oxidized, giving rise to a reduction in the ductility of the part and to premature rupture of the part.

Occluded pores of gas may also form in the part, coming firstly from the difference in solubility for the inert gas between the material (the powder) in the liquid phase and the material in the solid phase, particularly when the pool is rich in inclusions acting as seeds for the formation of gas pores, when the solidification range of the alloy is large, when the temperature of the pool and the solidification time are large, when the rate of solidification of the liquid pool is fast, and also when the powder particles may also previously contain occluded gas. These closed pores of spherical shape contribute to reducing the mechanical properties of the part.

Figure 2:
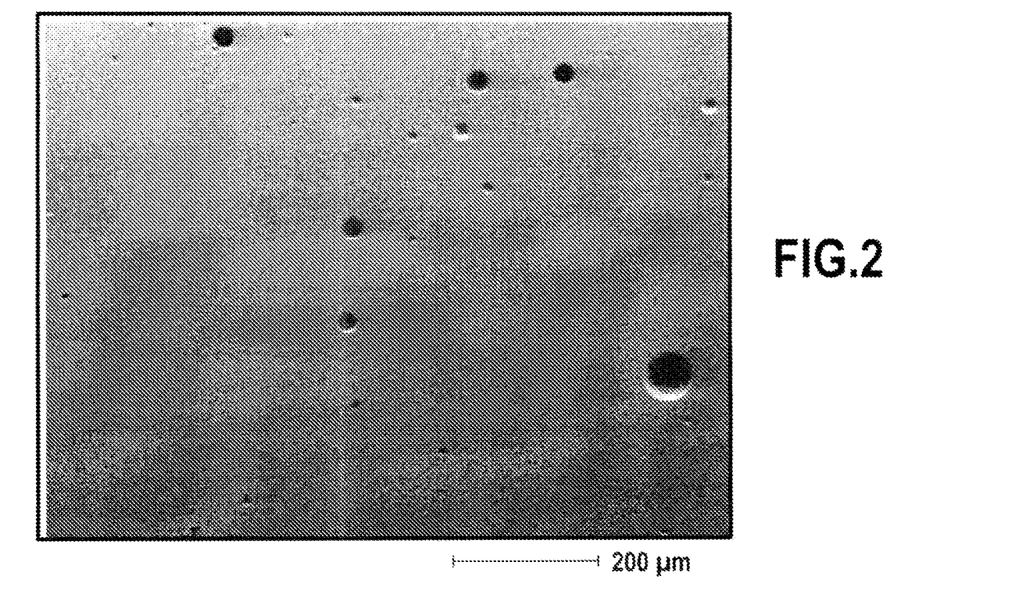
FIG. 2 shows the spherical pores that form within the as-fabricated material when using the prior art method.

FIG. 2 shows undesirable spherical pores that form within the as-fabricated part (specifically made of Inconel 718) when using the prior art selective laser melting method (this image was obtained by observing the material with a scanning electron microscope using secondary electrons and after polishing the material).

Figure 3:
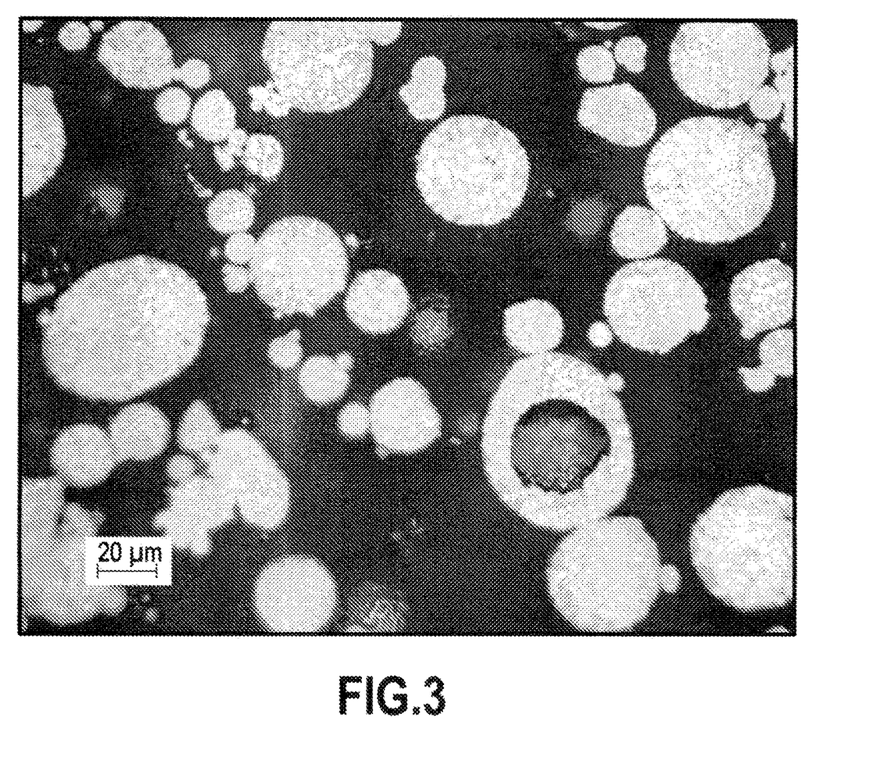
FIG. 3 shows the occluded gas pores that form within powder particles obtained by gas atomization.

FIG. 3 shows occluded gas pores formed upstream within the powder particles, e.g. when the particles are obtained by gas atomization (this image was obtained by observing the powder using an optical microscope and after polishing and chemical etching).

Figure 4A:
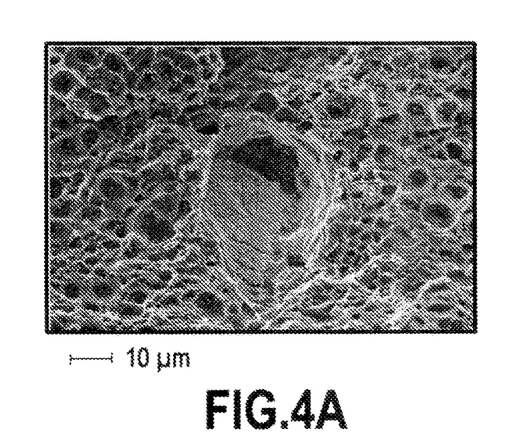
FIGS. 4A and 4B show the oxide film that forms inside pores within the molten material when using the prior art method of selective melting by laser.
Figure 4B:
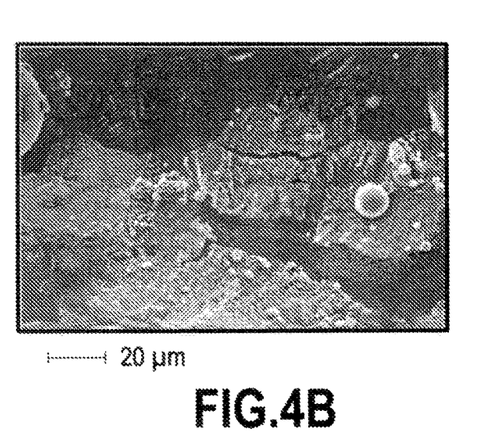

When the prior art method of selective laser melting is used, an oxide film may also form inside such pores, as shown in two micrograph views of FIGS. 4A and 4B, which show the surface that is obtained after rupture in an AlSi10Mg alloy.

Figure 5A:
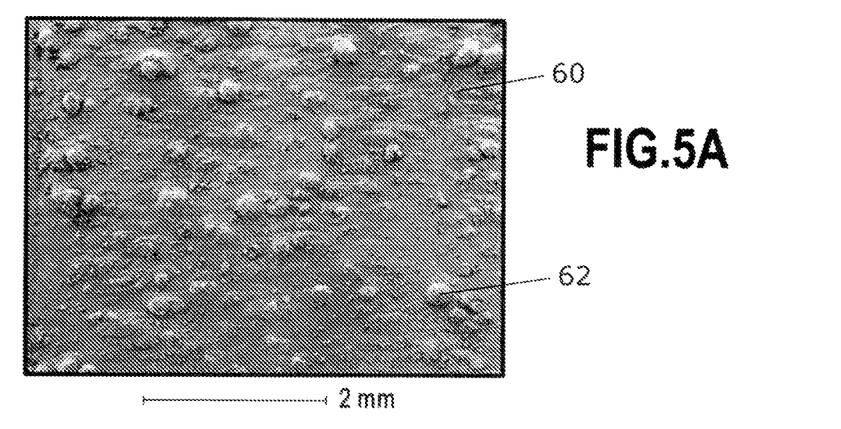
FIGS. 5A, 5B, and 5C, described above, are on different scales and show the beads that are formed by material being ejected from the surface of the molten material and solidifying, the beads being shown in comparison with the powder particles used initially.
Figure 5B:
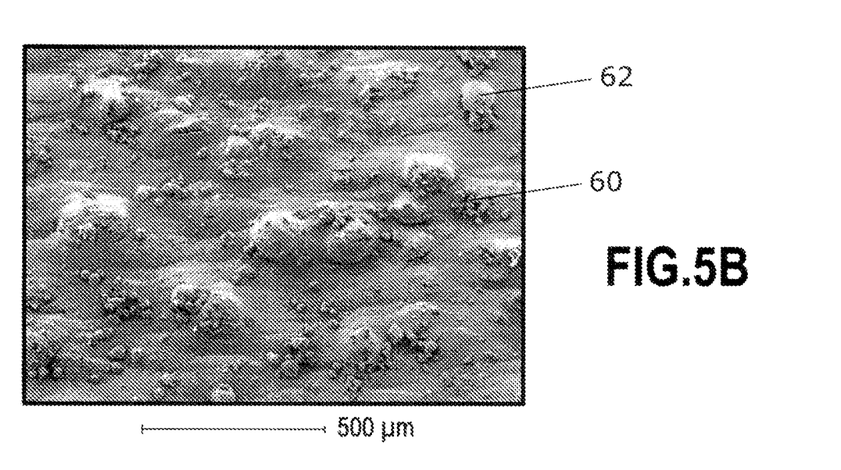
Figure 5C:
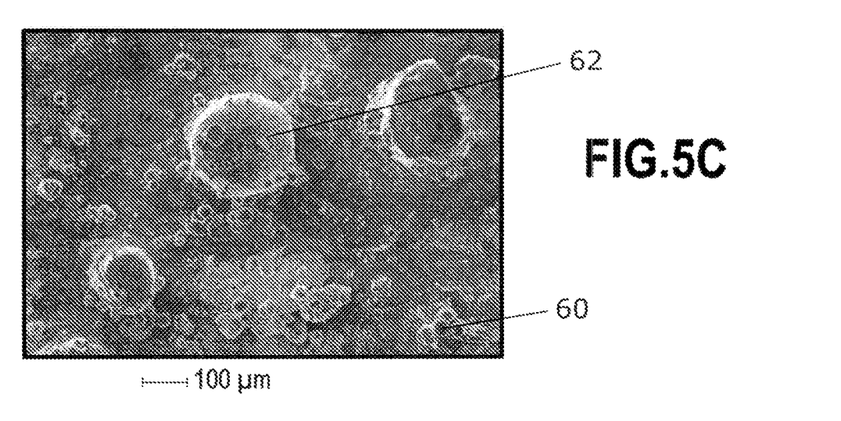

Furthermore, the presence of gas-filled gaps between the powder particles encourages material to be ejected under the laser beam during selective melting of the powder bed, and that is troublesome for making layers of powder and for recycling the powder. Such ejections of material are often in the form of large beads (much larger than the powder particles and possibly even larger than the thickness of the powder bed) that become welded to the surface of the molten material, thereby preventing the following layer being put into place and leading to fabrication defects. FIGS. 5A, 5B, and 5C show these beads 62 present on the surface of a layer that has just been fabricated. These beads 62 present a diameter of more than 200 μm, i.e. a size that is about ten times greater than the size of the unmelted powder particles 60, some of which also remain present on the surface of a layer that has just been fabricated, as can be seen in FIGS. 5A, 5B, and 5C.

It can sometimes even happen that these large beads come to land either in the powder bed in a region that has not yet melted, or in the recycling bin, making it necessary for the manufacturer to screen the recovered powder in order to eliminate any large beads in preparation for subsequent fabrication.

When using selective sintering of powder beds by high energy beam, the above-described problems can be encountered, at least in part, when the sintering is liquid phase sintering with the material melting in part. Furthermore, under such circumstances and when performing solid phase sintering, obtaining a part that is as compact as possible, i.e. obtained by effective densification of the material, requires conditions that are favorable to diffusion of the material, and in particular to maintaining a temperature higher than the minimum sintering temperature for a relatively long period of time.

An object of the present invention is to provide a method of fabricating a part by selective melting or selective sintering of powder beds by high energy beam that makes it possible to overcome the drawbacks of the prior art.

This object is achieved by the fact that the powder has a grain size distribution that is multimodal.

In the invention, the powder used does not present a grain size distribution that is monomodal, like the grain size distribution of a conventional powder, which is generally of the Gaussian type (it should be recalled that the compactness of packed powder particles increases when the Gaussian type distribution of its particle sizes becomes wider).

By means of the invention, the coordination number and the compactness (or relative density) of the powder bed are increased by its porosity being decreased in optimum manner, with this taking place before the material is melted or sintered and solidified.

It is thus possible to make a powder bed that is much more compact prior to melting or sintering.

This leads to smaller gaps being present between the particles before they melt, and to a smaller volume of gas that might be held captive during the melting or sintering of powder particles under a laser beam.

As a result, it follows firstly that the phenomenon of gas becoming held captive within the melted or sintered material is reduced, and secondly that the phenomenon of material being ejected under the laser beam is diminished, thereby consequently reducing fabrication defects (other than occluded gas pores), thus improving the metallurgical quality, the dimensional quality, and the mechanical strength of the part.

The solution of the invention thus makes it possible to reduce very significantly the number of pores and of build defects and also their size in the part obtained by selective melting or selective sintering of powder beds by high energy beams, and thus contributes greatly to improving the mechanical properties of said part.

Furthermore, the productivity of the method is increased because the powder bed is more compact, other things being equal. Specifically, there is less material shrinkage after consolidation. Furthermore, because material ejections under the high energy beam are reduced, it is no longer necessary to limit correspondingly the scanning speed of the higher energy beam.

Likewise, the more compact powder makes it possible to obtain a part that is more compact in a time that is shorter, in particular for selective sintering of powder beds, whether in liquid phase, or above all when the sintering is in solid phase.

Furthermore, advantageously, between steps a) and b), said powder of the feed bin 70 is continuously preheated to a preheating temperature Tp and an inert gas is caused to flow, preferably upwards, through said powder (comparable to a fluidized bed) so as to reduce the humidity of the air adsorbed on the surfaces of the powder particles.

Other advantages and characteristics of the invention appear on reading the following description made by way of example and with reference to the accompanying drawings, in which.

The device of the invention comprises a feed bin 70 containing the powder of a material, a roller 30 for transferring the powder from the bin 70 and spreading a first layer 10 of the powder on a build support 80 (which may be a solid support, a portion of another part, or a support grid used for facilitating the building of certain parts).

Advantageously, the device also has a recycling bin 40 for recovering powder comprising a tiny fraction of powder that has been used (in particular powder that has not melted and that has not been sintered), a few large beads that have been ejected from the preceding layer, and a major fraction of powder that was in excess after the powder layer was spread on the build support 80. Thus, the major fraction of the powder in the recycling bin is made up of new powder. The recycling bin 40 is often commonly referred to as the overflow bin or ashtray.

The device also has a generator 90 for generating a laser beam 95, and a control system 50 for aiming the beam 95 on any region of the build support 80 so as to scan any region of the layer of powder. The shaping of the laser beam and the varying of its diameter on the focal plane are performed respectively by means of a beam expander 52 and by means of a focusing system 54, which together constitute the optical system.

This device for applying the SLM or SLS method on a powder may use any high energy beam instead of the laser beam 95, providing the beam has sufficient energy either to melt or to form necks or bridges between powder particles and a portion of the material on which the particles rest.

The roller 30 may be replaced by any other suitable laying system, such as a dispenser (or hopper) associated with a scraper blade, a knife, or a brush, suitable for transferring and spreading the powder in layers.

By way of non-limiting example, the control system 50 comprises at least one steerable mirror 55 on which the laser beam 95 is reflected prior to reaching a layer of powder having each point on its surface situated at the same height relative to the focusing lens contained in the focusing system 54, the angular position of the mirror 55 being controlled by a galvanometer head so that the laser beam scans at least a region of the first powder layer, while also following a pre-established part profile.

In outline, use is made of a laser generator 90, of a system for adjusting the diameter of the laser beam, also referred to as a beam expander 52; of a system for scanning the laser beam, also referred to as a scanner 56, and of a system for focusing the laser beam 54. The beam expander 52 is made up of a set of lenses that are secured to one another so as to cause the diameter $\Phi$ of the optical fiber to change to the diameter (D>$\Phi$) of the laser beam that reaches the focusing lens. The focusing system for focusing the laser beam of diameter (D) is constituted by a focusing lens characterized by a focal length (f) that causes the diameter (D) of the laser beam to change to the diameter (d<D) on the focal plane defined by the surface of the build support 80 or the surface of the powder bed.

In the invention, use is made of a powder 60 made up of particles having a grain size distribution that is not monomodal, i.e. that is not centered on a single mean diameter value, but rather that is multimodal, i.e. that is centered on more than a single mean diameter value, namely on a plurality of mean diameter values.

Figure 6:
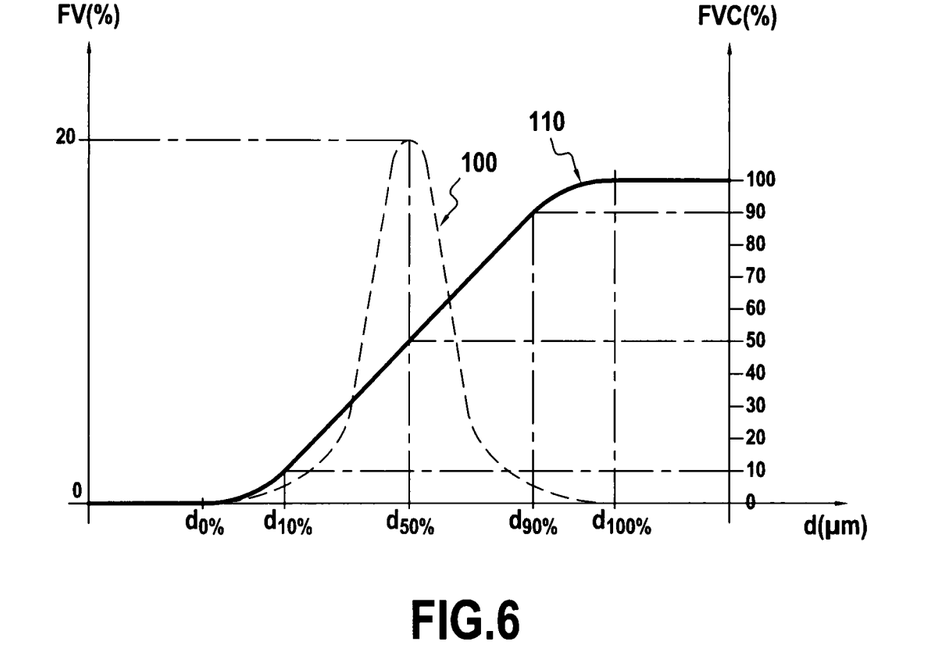
FIG. 6 is a diagram representing a monomodal grain size distribution of a powder with its associated cumulative volume fraction (FCV) curve.

The term "mean size" or "mean diameter" in the present patent application is used to mean the median diameter $d_{50\%}$, i.e. the diameter that corresponds to 50% of the cumulative volume or of the cumulative weight of powder particles presenting a size smaller than this median diameter value $d_{50\%}$, and 50% in cumulative volume or in cumulative weight of the powder particles presenting a size greater than this median diameter value $d_{50\%}$, as can be seen in FIG. 6, which is a diagram plotting a monomodal grain size distribution curve 100 of a powder (particle size d in micrometers), together with the associated cumulative volume fraction curve 110. Diameters $d_{0\%}$, $d_{10\%}$, $d_{50\%}$, $d_{90\%}$, and $d_{100\%}$ as used in the text below are marked on this monomodal grain size distribution curve 100.

It should be observed that any other mean diameter for a given particle size distribution obtained using any other characterization technique could be used in the context of the present invention.

In a provision that is preferred and advantageously the least expensive, the powder of said material has a grain size distribution that is bimodal, i.e. made up of two individual powder particle size distributions, with the grain size distribution of the powder then being centered around two median or average diameter values $d_{50\%}$.

The bimodal grain size distribution of the powder as a whole is thus the sum of two deconvoluted grain size distributions, each of them being characterized by a mean size and a size span defined by $d_{90\%}-d_{10\%}$, or preferably by $d_{100\%}-d_{0\%}$. It should be recalled that the span of a grain size distribution is more usually quantified by using a uniformity coefficient $C_u$ that is defined for a volume size distribution by a width divided by the median diameter, i.e. $C_u=(d_{90\%}-d_{10\%})/d_{50\%}$.

These two individual distributions may overlap to a greater or lesser extent, but it is preferable in the invention for the overlap to be negligible or for there to be no overlap.

Figure 7:
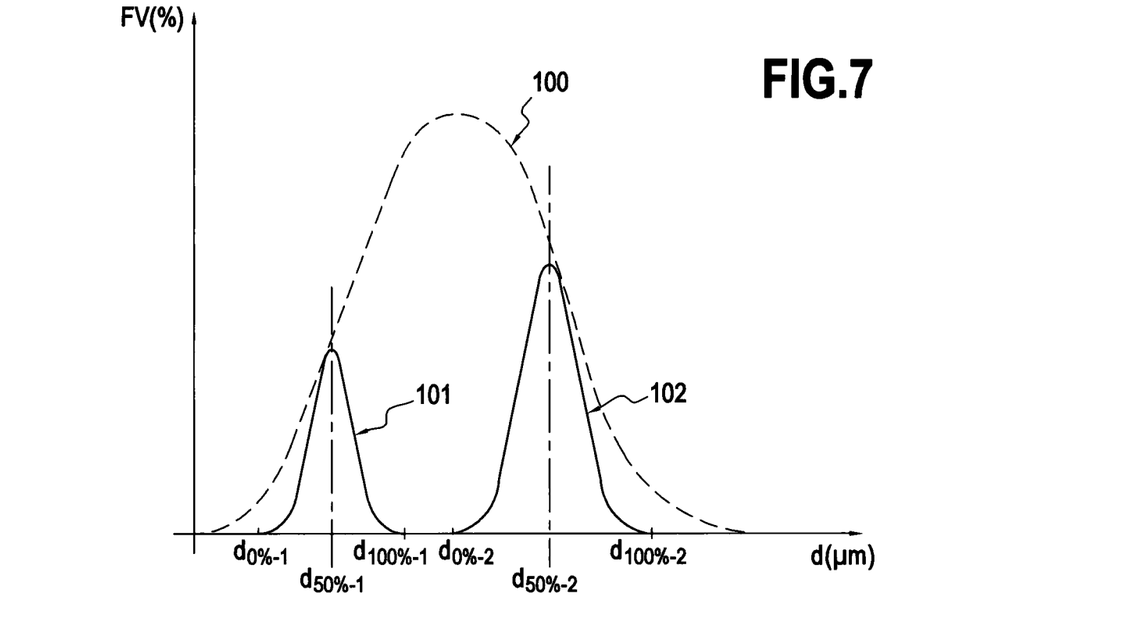
FIGS. 7 and 8 are diagrams of a bimodal particle size distribution of a powder suitable for use in the fabrication method of the invention, in two different circumstances.
Figure 8:
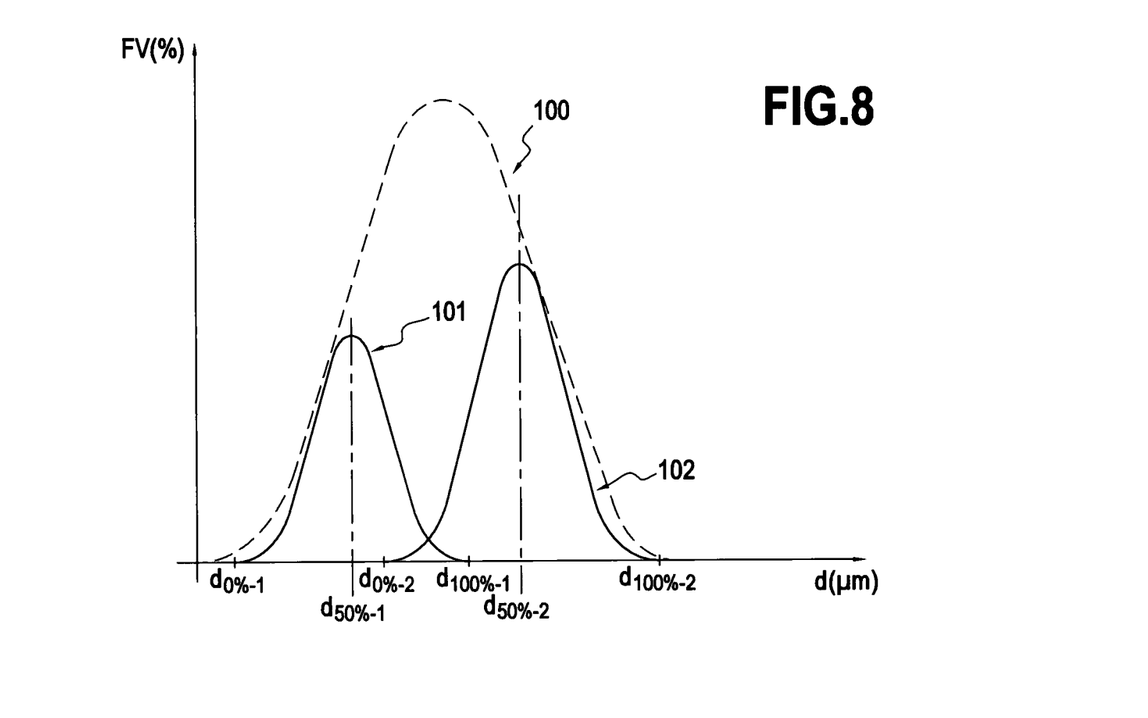

FIGS. 7 and 8 are diagrams for two situations, showing a bimodal grain size distribution of a powder suitable for use in the context of the fabrication method of the invention: the curve 101 corresponding to a first grain size distribution after selective sorting (e.g. by elutriation) having a first distribution of particles of small size centered around the median diameter $d_{50\%-1}$ and the curve 102 corresponding to a second grain size distribution, after selective sorting (e.g. by screening), comprising a second distribution of particles of large size centered around the median diameter $d_{50\%-2}$.

FIG. 7 shows the situation in which there is no overlap between the two curves 101 and 102: $d_{0\%-2}$ is greater than $d_{100\%-1}$.

FIG. 8 shows the situation in which the two curves 101 and 102 overlap: $d_{0\%-2}$ is less than $d_{100\%-1}$, $d_{50\%-1}$ is less than $d_{0\%-2}$, and $d_{100\%-1}$ is less than $d_{50\%-2}$.

When there is considerable overlap, it is necessary to perform deconvolution processing on the grain size distribution of the powder as a whole in order to define these individual distributions properly.

For a bimodal grain size distribution, the powder 60 advantageously has a first distribution of particles of small size (curve 101) having mean size centered around a first mean diameter value $d_{50\%-1}$ and a second distribution of particles of large size (curve 102) having mean size centered around a second mean diameter value $d_{50\%-2}$ that is substantially seven times greater than said first mean diameter value $d_{50\%-1}$. Preferably, the first particle distribution represents substantially 27% by weight of the powder (the second particle distribution then representing the balance, i.e. substantially 73% by weight of the powder).

Such a bimodal distribution with a size ratio of seven between the first mean diameter value $d_{50\%-1}$ and the second mean diameter value $d_{50\%-2}$ ($d_{50\%-1}/d_{50\%-2}=$ or $\approx 1/7$) gives rise to minimum porosity and maximum relative density for the powder bed, providing these two grain size distributions are thoroughly well mixed together (dry or using a wet technique) so as to obtain a completely homogeneous mixture. Dry mixing may be performed by diffusion (rotary drum), by convection (rotary screw), or by shear (rotary blade or fin).

This maximum relative density for the powder bed lies between the poured (or apparent) relative density and the vibrated (or tap) relative density corresponding respectively to the ratio between the poured (or apparent) density and the theoretical density and to the ratio between the vibrated (or tap) density and the theoretical density. The poured density corresponds to the apparent density of a powder poured in bulk into a container of appropriate and known volume with the powder remaining non-compacted other than by its own weight. In contrast, the vibrated density corresponds to the apparent density of the powder in the above container when compacted on a vibrating tray without any other applied pressure. It should be emphasized that the compacted and poured densities of powders are generally determined using an appliance known as a "Hall flowmeter" in application of the ASTM-B527-93(2000) standard.

More precisely, in the ideal situation where the particles are same-size spheres with a mean size ratio of 1/7, and where the first particle distribution represents 27% by weight, calculation makes it possible to show that an optimum relative density of 0.86 is obtained (compared with 0.74 for a monomodal grain size distribution corresponding to a regular packing of face centric cubic type or of compact hexagonal type with coordination number 12) and porosity of 14% (as compared with 26% for a monomodal grain size distribution). It should be recalled that the compactness of random close packing (RCP) of mono-dispersed spherical particles is about 0.64 (for a large sphere diameter), which is close to the poured relative density of such a powder.

For example, use is made of the powder having a bimodal distribution in which the first mean diameter value $d_{50\%-1}$ is 3.5 μm with $d_{10\%-1}$ and $d_{90\%-1}$ respectively being 2.2 μm and 10 μm, and the second mean diameter value $d_{50\%-2}$ is about seven times larger, i.e. $d_{50\%-2}$ is 24.5 μm with $d_{10\%-2}$ and $d_{90\%-2}$ being respectively 15 μm and 50 μm.

The first grain size distribution presents particle sizes that are preferably not less than 1 μm and not more than 15 μm.

The second grain size distribution presents particle sizes that should preferably not be less than 10 μm and not be greater than 53 μm.

For example, these two distributions may be deduced from selective grain size sorting by screening for the larger particles (≥8 μm or ≤0.400 mesh) and by elutriation for the smaller particles (<38 μm) in a stream of air, nitrogen, or argon.

These two distributions can be taken from a much wider distribution (e.g. having particles of size d lying in the range 1 μm to 150 μm), thereby necessarily leading to a quantity of powder that is not suitable for use in the method and for which a use needs to be found.

According to another preferred provision, which is nevertheless much more expensive, the powder has a grain size distribution that is trimodal.

Under such circumstances, and advantageously, the powder 60 has a first distribution of particles of small size with mean size centered around a first mean diameter value, a second distribution of particles of medium size with mean size centered around a second mean diameter value that is substantially seven times greater than said first mean diameter value, and a third distribution of particles of large size of mean size that is centered around a third mean diameter value that is substantially forty-nine times greater than said first mean diameter value. Preferably, the first distribution of particles represents substantially 11% by weight of the powder, and the second distribution of particles represents substantially 14% by weight of the powder (the third particle distribution then represents the balance, i.e. substantially 75% by weight of the powder).

Such a trimodal distribution with a size ratio of seven between the second mean diameter value and the first mean diameter value and a size ratio of forty-nine between the third mean diameter value and the first mean diameter value leads to minimum porosity and maximum relative density for the powder bed which is situated between the poured relative density and the vibrated (or tap) relative density.

More precisely, in the ideal situation where the particles are single-sized spheres with mean size ratios of 1/7 between the first and second distributions and of 1/49 between the first and third distributions, calculation makes it possible to show that an optimum relative density of 0.95 is obtained (as compared with 0.74 for a monomodal grain size distribution) and a porosity of 5% is obtained (as compared with 26% for a monomodal grain size distribution).

For example, use is made of a powder having a trimodal distribution in which the first mean diameter value $d_{50\%-1}$ is 0.50 μm for $d_{10\%-1}$ and $d_{90\%-1}$ being equal respectively to 0.25 μm and 1.5 μm, the second mean diameter value $d_{50\%-1}$ is about seven times larger giving $d_{50\%-2}$ equal to 3.5 μm for $d_{10\%-2}$ and $d_{90\%-2}$ respectively equal to 2.2 μm and 10 μm, and the third mean diameter value $d_{50\%-3}$ is about forty-nine times greater than the first mean diameter value, giving $d_{50\%-3}$ equal to 24.5 μm and $d_{10\%-3}$ and $d_{90\%-3}$ respectively equal to 15 μm and to 50 μm. The first grain size distribution presents particle sizes that preferably do not go below 0.1 μm or above 2.5 μm. The second grain size distribution presents particle sizes that preferably do not go below 1 μm or above 15 μm. The third distribution presents particle sizes that preferably do not go below 10 μm or above 53 μm.

Concerning the composition of the powder, and the distribution of its composition among the particles, or indeed within each particle, it is possible to devise numerous configurations.

In one possible provision, all of the particles of the powder present identical and homogeneous composition.

By way of example, it is also possible advantageously to use a powder 60 that is in full or in part a pre-alloyed powder obtained by a method of synthesizing powder from a single parent alloy.

Obtaining such a pre-alloyed powder is well known to the person skilled in the art, in particular by gaseous atomization of a liquid presenting the composition desired for the powder (parent mixture), and forming droplets that solidify and thus form the powder particles.

It is possible to use a powder 60 that is in full or in part a coated powder, i.e. a powder in which the particles present compositions that are different in a core and in a cover situated around the core.

It is also possible to envisage a pre-alloyed powder of agglomerated type, which is obtained by agglomerating a mixture of a metallic powder (matrix) and a ceramic powder (reinforcement) with an aqueous binder including an agglomerating agent of the polyvinyl alcohol type or of the cellulose type or indeed of the polyethylene glycol type, which is then thermally consolidated and optionally spheroidized.

It is also possible to use a powder 60 in which the first particle distribution and the second particle distribution present mutually different chemical compositions.

It is also possible to imagine that the first particle distribution is already constituted by a mixture of two powders of different chemical compositions, and possibly also the second particle distribution.

Preferably, said material made up of particles of said powder is metallic, or intermetallic, or ceramic, or polymeric.

Advantageously, said material made up of particles of said powder is metallic and belongs to the group comprising alloys based on iron, alloys based on titanium, alloys based on cobalt, alloys based on copper, alloys based on magnesium, alloys based on aluminum, alloys based on molybdenum, alloys based on tungsten, alloys based on zirconium, alloys based on silver, alloys based on tantalum, alloys based on zinc, alloys based on gold, alloys based on niobium, alloys based on platinum, and superalloys based on nickel.

In another preferred provision, said material is metallic and is made of said powder that belongs to the group comprising TA6V and Inconel 718 (registered trademark).

The TA6V alloy is the well-known and widely-used titanium alloy that includes 6% by weight aluminum and 4% by weight vanadium.

The term Inconel 718 (registered trademark) alloy is used to mean the nickel-based alloy that presents the following composition:

| Element | % wt |
| --- | --- |
| Ni | 50.0 to 55.0 |
| Cr | 17.0 to 21.0 |
| Fe | Balance to 100% |
| Mo | 2.80 to 3.30 |
| Nb | 4.75 to 5.50 |
| Co | 1.0 max |
| Mn | 0.35 max |
| Cu | 0.30 max |
| Al | 0.20 to 0.80 |
| Ti | 0.65 to 1.15 |
| Si | 0.35 max |
| C | 0.08 max |
| S | 0.015 max |
| P | 0.015 max |
| B | 0.006 max |

To perform the method, nothing changes from the above description of the prior art method, except for the multimodal grain size distribution of the powder 60. Thus, in the example of the powder having a single composition, e.g. the Inconel 718 (registered trademark) alloy, it is possible to start from a batch of powder presenting a monomodal grain size distribution curve 100 that is subjected to selective sorting in order to retain from among all of those initial particles two (or more) subgroups of powder particles of respective sizes centered on a first mean diameter value (first distribution of small-size particles centered around the median diameter $d_{50\%-1}$) and on a second mean diameter value (second distribution of large-size particles centered around the median diameter $d_{50\%-2}$), with this being done as shown in FIGS. 7 and 8.

Thereafter, these two subgroups of powder particles are mixed together at a well-defined weight ratio so as to have a homogeneous mixture.

Thereafter, a portion of the powder 60 is taken from the feed bin 70 onto the build support 80 where it is spread so as to form a first layer 10 of powder using the laying system 30.

Thereafter, a region of this first layer 10 of powder is raised to a temperature higher than the melting (or sintering) temperature of the powder by scanning with the high energy beam 95 so that the powder particles in this region of the first layer 10 melt (or are sintered) and form a first single-piece element 15, which is a portion of the part being built.

Advantageously, said high energy beam 95 is a laser beam.

Advantageously, the powder particles 60 are heated using the laser beam 95 to a temperature that is not much greater than the melting temperature $T_F$ of the material constituting the powder so as to avoid fumes being given off by vaporization and so that the finest, non-melted powder particles 60 that are in intimate contact with the part being built do not weld together.

For example, the powder particles constituting the liquid pool are not heated above the powder boiling point $T_{evap}$. For a mixture of two powders of different chemical compositions, it is appropriate to avoid heating the particles of the mixture above the lower evaporation point.

The higher layers of the part are then built in succession as described above.

When, instead of using a support grid, use is made of a build support 80 that is solid or a portion of another part, then the build support may also be preheated to a substrate temperature Ts so as to relax somewhat the residual stresses in the bottom of the part being built. Also, for the same reasons mentioned above, it is appropriate to avoid preheating said build support 80 to above $T_F/2$, and better to avoid heating it to above $T_F/3$.

Advantageously, particle powders 60 are used that do not have any occluded gas and that are free form foreign particles. Thus, the finished part is less likely to include defects such as pores and inclusions or intermetallic precipitates.

Advantageously, before depositing the powder on the build support 80, the powder is previously heated for a sufficient length of time (e.g. 0.5 hours (h) to 3 h depending on the weight of powder) to a preheating temperature $T_P$, e.g. by heating the powder feed bin 70. This preheating temperature $T_P$ is well below the melting temperature $T_F$.

Furthermore, a gas that is inert for the material in question, e.g. argon, is caused to flow around the powder particles 60 in the feed bin (comparable to that which takes place within a fluidized bed). This flow of inert gas is preferably upward.

Thus, the humidity of air that is adsorbed on the surfaces of the powder particles 60 is reduced or even eliminated.

Consequently, this serves firstly to facilitate spreading of the powder on the build support 80, since the powder particles 60 are less likely to agglomerate.

Secondly, this serves to avoid oxide(s) forming and to avoid hydrogen being given off as might be caused by water vapor reacting with the liquid of the powder material (e.g. with aluminum alloys the following reaction occurs:

$2Al_{liquid} + 3H_2O_{vapor} \rightarrow Al_2O_{3solid} + 3H_{2gas}$), and consequently the formation of fabrication defects in the part is minimized.

For example, the preheating temperature $T_p$ may lie in the range 80° C. to 150° C.

In the context of the present invention, in a variant, it is possible to generate and use simultaneously and in parallel a plurality of high energy beams, for the purpose of implementing a fabrication method in which a plurality of regions of the part that are situated in the same plane are built simultaneously, thereby saving fabrication time, or indeed extending the heated region of the powder in each new layer under temperature conditions that are satisfactory for obtaining the melting or sintering of the powder in this region so as to enable a part to be fabricated that is of larger size.

In preferred manner, and in order to enhance geometrical and spatial rearrangement between the particles of the powder bed, so as to ensure the greatest possible compactness, between the steps b) and c), and also between the steps d) and e), an additional step is performed in which the build support 80 and/or the build bin 85 is/are subjected to ultrasound vibration, in particular by using a sonotrode system (not shown) that may be directly in contact with the build support 80 or else indirectly in contact with the build support 80 (e.g. because it is directly in contact with the build bin 85).

The invention claimed is:

1. A fabrication method for fabricating a part by selective melting or selective sintering of powder beds by an energy beam, the method comprising:
    a) providing a material in the form of powder particles;
    b1) preheating a build support;
    b2) depositing a first powder layer of said material on the preheated build support;
    c) scanning at least one region of said first powder layer with the energy beam so as to heat the powder of said region locally to a temperature higher than the sintering temperature of the powder, such that the particles of said powder as melted or sintered in said region form at least a first single-piece element;
    d) depositing a second powder layer of said material on said first powder layer;
    e) scanning at least one region of said second powder layer with the energy beam so as to heat the powder of said region of said second powder layer to a temperature higher than the sintering temperature of the powder, so that the particles of powder as sintered or melted form at least one second single-piece element; and
    f) repeating steps d) and e) for each new powder layer to be laid over a preceding layer to form the part;
    wherein the powder comprises a grain size distribution that is multimodal and wherein, between steps a) and b2), said powder is continuously preheated to a preheat temperature and wherein between steps a) and b2) the method further comprises forming a flow of an inert gas along a direction towards the powder particles so that said inert gas flows through said powder so as to diminish air humidity adsorbed on the surface of the powder particles.

2. A fabrication method according to claim 1, wherein the powder has a grain size distribution that is bimodal.

3. A fabrication method according to claim 2, wherein the powder has a first distribution of particles having mean size centered around a first mean diameter value and a second distribution of particles having mean size centered around a second mean diameter value that is substantially seven times greater than said first mean diameter value, and wherein the first particle distribution represents substantially 27% by weight of the powder.

4. A fabrication method according to claim 3, wherein the first particle distribution and the second particle distribution present mutually different chemical compositions.

5. A fabrication method according to claim 3, wherein the first particle distribution is constituted by a mixture of two powders of different chemical compositions.

6. A fabrication method according to claim 3, wherein all particles of the first distribution of particles have a smaller size than the particles of the second distribution of particles.

7. A fabrication method according to claim 3, wherein the first and second distributions of particles each include particle sizes such that the first distribution of particles partly overlaps the second distribution of particles.

8. A fabrication method according to claim 1, wherein the powder has a grain size distribution that is trimodal.

9. A fabrication method according to claim 8, wherein the powder has a first distribution of particles with mean size centered around a first mean diameter value, a second distribution of particles with mean size centered around a second mean diameter value that is substantially seven times greater than said first mean diameter value, and a third distribution of particles of mean size that is centered around a third mean diameter value that is substantially forty-nine times greater than said first mean diameter value, wherein the first distribution of particles represents substantially 11% by weight of the powder, and wherein the second distribution of particles represents substantially 14% by weight of the powder.

10. A fabrication method according to claim 1, wherein all of the particles of the powder present identical and homogeneous composition.

11. A fabrication method according to claim 1, wherein the powder is a pre-alloyed powder obtained by a method of synthesizing powder from a single parent alloy.

12. A fabrication method according to claim 1, wherein the powder is in full or in part a coated powder.

13. A fabrication method according to claim 1, wherein said material made up of particles of said powder is metallic, or intermetallic, or ceramic, or polymeric.

14. A fabrication method according to claim 13, wherein said material made up of particles of said powder is metallic and belongs to the group consisting of alloys based on iron, alloys based on titanium, alloys based on cobalt, alloys based on copper, alloys based on magnesium, alloys based on aluminum, alloys based on molybdenum, alloys based on tungsten, alloys based on zirconium, alloys based on silver, alloys based on tantalum, alloys based on zinc, alloys based on gold, alloys based on niobium, alloys based on platinum, and superalloys based on nickel.

15. A fabrication method according to claim 14, wherein said metallic material made up of said powder belongs to the group consisting of TAV6 and Inconel 718 (registered trademark), wherein Inconel 718 has the following composition: 50.00 to 55.00 wt % Ni, 17.00 to 21.00 wt % Cr, 0.30 wt % max Cu, 2.80 to 3.30 Mo, 4.75 to 5.50 wt % Nb, 0.08 wt % max C, 0.35 wt % max Mn, 0.015 wt % max P, 0.015 wt % max S, 0.35 wt % max Si, 0.65 to 1.15 Ti, 0.20 to 0.80 Al, 1.00 wt % max Co, 0.006 wt % max B, remainder Fe.

16. A fabrication method according to claim 1, wherein said energy beam is a laser beam.

17. A fabrication method according to claim 1, wherein said preheat temperature lies in the range 80° C. to 150° C.

18. A fabrication method according claim 1, wherein between steps b2) and c), and between steps d) and e), the build support is subjected to ultrasound vibration.

19. A fabrication method according to claim 1, further comprising moving the build support along a first direction between step c) and d), wherein said first direction is opposite to said direction of the flow of the inert gas towards the powder particles.

20. A fabrication method according to claim 19, wherein said first direction is a downward direction and said direction of the flow of the inert gas towards the powder particles is an upward direction.

* * * * *